(12) United States Patent
Xie

(10) Patent No.: US 9,744,798 B2
(45) Date of Patent: Aug. 29, 2017

(54) FLUORESCENT BLACKBOARD

(71) Applicant: HaoYu Xing, Shenzhen (CN)

(72) Inventor: Hong Xie, Shenzhen (CN)

(73) Assignee: Haoyu Xing, Shenzhen (CN)

( * ) Notice: Subject to any disclaimer, the term of this patent is extended or adjusted under 35 U.S.C. 154(b) by 23 days.

(21) Appl. No.: 14/786,539

(22) PCT Filed: Jun. 26, 2013

(86) PCT No.: PCT/CN2013/078001
§ 371 (c)(1),
(2) Date: Oct. 22, 2015

(87) PCT Pub. No.: WO2014/205673
PCT Pub. Date: Dec. 31, 2014

(65) Prior Publication Data
US 2016/0059615 A1     Mar. 3, 2016

(30) Foreign Application Priority Data

Jun. 25, 2013 (CN) .......................... 2013 1 0256078

(51) Int. Cl.
G02F 1/1333 (2006.01)
G06F 1/16 (2006.01)
(Continued)

(52) U.S. Cl.
CPC ............ *B43L 1/004* (2013.01); *B43K 23/001* (2013.01); *B43L 1/00* (2013.01);
(Continued)

(58) Field of Classification Search
CPC ... G02F 1/133308; G02F 2001/133322; G06F 1/1637
See application file for complete search history.

(56) References Cited

U.S. PATENT DOCUMENTS 5,038,142 A * 8/1991 Flower .................. G06F 3/0414
341/34
5,550,712 A * 8/1996 Crockett ................ H05K 7/142
174/564
(Continued)

FOREIGN PATENT DOCUMENTS

CN       1631684 A    6/2005
CN    201086536 Y    7/2008
(Continued)

OTHER PUBLICATIONS

Sun Dalin, the International Searching Authority written comments, Mar. 2014, CN.

Primary Examiner — Adrian S Wilson

(57) ABSTRACT

A fluorescent blackboard comprises a housing, a circuit hoard fixed on the housing by screws, a display screen fixed by the circuit board, and a panel attached and fixed on the housing by the adhesive tape. The fluorescence blackboard is configured with a fixed device that limits and fixes the panel. The present disclosure uses that the fluorescent blackboard 1 configured with the fixed device that limits and fixes the panel, which makes the panel be firmly limited and fixed on the housing, which avoids the panel from coming lose. When the panel is squeezed, the fixed device can protect the panel, which avoids damage to the panel.

7 Claims, 2 Drawing Sheets

(51) Int. Cl.
*B43L 1/00* (2006.01)
*B43K 23/00* (2006.01)

(52) U.S. Cl.
CPC ...... *G02F 1/133308* (2013.01); *G06F 1/1637* (2013.01); *G02F 2001/133322* (2013.01)

(56) References Cited

U.S. PATENT DOCUMENTS

| | | | | |
|---|---|---|---|---|
| 5,579,036 A * | 11/1996 | Yates, IV | | G06F 3/044 |
| | | | | 178/18.06 |
| 5,659,376 A * | 8/1997 | Uehara | | G02F 1/133308 |
| | | | | 348/794 |
| 6,532,152 B1 * | 3/2003 | White | | G02F 1/133308 |
| | | | | 312/223.1 |
| 7,333,163 B2 * | 2/2008 | Huang | | G02F 1/133308 |
| | | | | 349/58 |
| 7,551,430 B2 * | 6/2009 | Chen | | G02F 1/13452 |
| | | | | 349/58 |
| 7,780,333 B2 * | 8/2010 | Hsu | | G02F 1/133606 |
| | | | | 349/58 |
| 7,864,261 B2 * | 1/2011 | Chen | | G02B 6/0088 |
| | | | | 349/58 |
| 8,031,289 B2 * | 10/2011 | Naritomi | | G02F 1/133608 |
| | | | | 349/58 |
| 9,235,240 B2 * | 1/2016 | Pakula | | G06F 1/1626 |
| 2002/0064036 A1 * | 5/2002 | Yano | | G02F 1/133308 |
| | | | | 361/809 |
| 2003/0223187 A1 * | 12/2003 | Tsao | | G06F 1/1637 |
| | | | | 361/679.59 |
| 2005/0117086 A1 * | 6/2005 | Sugahara | | G02F 1/133308 |
| | | | | 349/58 |
| 2005/0151894 A1 * | 7/2005 | Katsuda | | G02F 1/133308 |
| | | | | 349/58 |
| 2005/0243238 A1 * | 11/2005 | Cha | | G02B 6/0088 |
| | | | | 349/58 |
| 2006/0238446 A1 * | 10/2006 | Takahashi | | G06F 1/1601 |
| | | | | 345/55 |
| 2009/0114144 A1 | 5/2009 | Keefe | | |
| 2011/0187245 A1 * | 8/2011 | Pakula | | G06F 1/1626 |
| | | | | 312/223.1 |
| 2012/0250284 A1 * | 10/2012 | Abe | | G06F 1/162 |
| | | | | 361/807 |
| 2014/0055976 A1 * | 2/2014 | Gu | | H05K 5/03 |
| | | | | 361/809 |

FOREIGN PATENT DOCUMENTS

| | | |
|---|---|---|
| CN | 201544640 U | 8/2010 |
| CN | 202062887 U | 12/2011 |
| CN | 202088730 U | 12/2011 |
| CN | 103342068 A | 10/2013 |
| CN | 203381386 U | 1/2014 |
| KR | 2011011280 A | 9/2011 |

* cited by examiner

FLUORESCENT BLACKBOARD

TECHNICAL FIELD

The present disclosure relates to the field of household electrical appliances, and more particularly to a fluorescent blackboard.

BACKGROUND

Currently, a fluorescent blackboard is also known as a fluorescent handwritten blackboard, a light-emitting diode (LED) handwritten electronic fluorescent blackboard, an LED fluorescent blackboard, an electronic fluorescent blackboard, or a cable color fluorescent blackboard, etc., which is written using a highlighter. When power is turned on, a light source by an LED chip of a sidewall of the fluorescence blackboard irradiates onto an acrylic panel or an ultra-white glass panel. Different colors for different words are displayed when the highlighter is used to write on the fluorescence blackboard, and different effects are showed, which attracts people's attention. The fluorescent blackboard is mainly used for different industries, such as the electronics industry, the food industry, the telecommunications industry, the stationery industry, and the jewelry industry.

Applicant has designed a fluorescent blackboard, which is a blackboard-like cuboid structure, where height of the fluorescent blackboard is much less than length and width of the fluorescent blackboard. The fluorescent blackboard includes a housing, a circuit board fixed on the housing by screws, a panel attached and fixed on the housing by adhesive tape, a highlighter used to write words on the panel, a battery for power, and an alarm clock. The alarm clock includes a display screen that displays time, buttons that adjust time and sound of the alarm clock. The fluorescent blackboard is battery powered, which is convenient use anywhere and anytime. Furthermore, the fluorescent blackboard is small, which is easy to carry. In addition, the fluorescent blackboard includes the alarm clock to set time according to need, which reminds the user to be on time. The panel is attached and fixed on the housing by the adhesive and a through hole is arranged on the housing and is used for the panel; however, because the panel may be carried during transportation and use, it is easy to tear the adhesive tape, and the panel may be damaged or be lost.

SUMMARY

The aim of the present disclosure is to provide a fluorescent blackboard capable of firmly fixing a panel and avoiding damaging to the panel.

The aim of the present disclosure is achieved by the following methods:

The fluorescent blackboard comprises: a housing, a circuit board fixed on the housing by screws, a display screen fixed by the circuit board, a panel attached and fixed on the housing by an adhesive tape, and a fixed device that limits and fixes the panel.

Furthermore, the housing is configured with a first through hole for the panel. The fixing device comprises a limiting column arranged around the first through hole and the panel is configured with a limiting hole that matches with the limiting column. The panel is placed on the first through hole. The limiting column is inserted into the limiting hole of the panel, which limits the panel and avoids the panel from moving at left and right directions of the panel, further fixing the panel.

Furthermore, a cross-section of the panel is rectangular. The number of the limiting holes is four, and the four limiting holes are arranged on four corners of the panel, respectively. Correspondingly, the four limiting holes matches with the four limiting columns, respectively, which makes the limiting column uniformly limit the panel, further improving limiting effect.

Furthermore, the panel is configured with an end portion placed between the display screen and the circuit board. The circuit board is fixed to the housing by the screws, and the circuit board is arranged on the display, which makes the display screen fix. The end portions of the panel is arranged between the display screen and the circuit board, which makes the circuit board fix the circuit board and the end portions, further fixing the panel.

Furthermore, the housing is configured with a second through hole for the display screen. A depression is formed around outside direction of an edge of the second through hole, the display screen is placing on the depression, and the end portions are closely fixed to the display screen. Therefore, the panel does not need to be tilted when installed and can be installed flat, which is convenient to fix the panel to the housing.

Furthermore, the end portion is configured with a third through hole or a groove that evades the display screen and the circuit board. The display screen is connected with the circuit board. A top part of the end portion is configured with the groove, which is convenient to make the display screen match and connect with the circuit board. It should be understood that the third through hole can replace the groove.

Furthermore, the housing is configured with four screw hole columns that matches with the circuit board, where two of the four screw hole columns are arranged on two sides of the end portions, respectively, and two of the four screw hole columns are arranged on an connection position of the end portion and the panel. The panel is configured with two column holes that matches with the screw hole column, which limits and fixes the panel.

Furthermore, the housing comprises a front housing and a rear housing, where the panel and a display screen are arranged on the front housing. When the front housing and the rear housing are fixed, the supporting column closely matches with the panel, which makes the panel be firmly fixed by the supporting column. When the panel is squeezed, the supporting column supports the panel under the pressure, which avoids the adhesive tape from losing its stickiness.

Furthermore, the fixed device comprises a supporting column, where the number of the supporting columns is four, and the four supporting columns are arranged according to positions of the four limiting columns, respectively. The supporting column is configured with a groove placed by the limiting column. Therefore, the front housing and the rear housing are fixed and limited each other, which avoids the panel moving at left and right directions of the panel, further avoiding the supporting column damaging the panel.

Furthermore, the fixed device comprises a supporting element fixed between the panel and a rear housing by glue or double-sided adhesive tape, where the supporting element is made of a flexible and elastic material. The supporting elements are arranged at intervals. The supporting column is arranged on an edge of the panel, which avoids damage to the panel when the panel is squeezed or during installation of the panel. The supporting element is made of the flexible and elastic material, which avoids damage to the panel. The supporting element is corresponding compressed when the panel 3 is squeezed, and the supporting element restores an original state after the panel is squeezed, which improves limiting effect and protection of the panel.

The present disclosure uses the fluorescent blackboard is configured with the fixed device that limits and fixes the panel, which makes the panel be firmly limited and fixed on the housing, which avoids the panel coming lose. When the panel is squeezed, the fixed device can protect the panel, which avoids damage to the panel 3.

Legends: 1. front housing; 2. fluorescent blackboard; 21. first through hole; 22. second through hole; 23. limiting column: 24. screw hole column; 25. depression; 3. panel; 31. end portions; 4. display screen; 5. circuit board; 6. rear housing; 61. supporting column; 62. groove.

DETAILED DESCRIPTION

The present disclosure will further be described in detail in accordance with the figures and the exemplary examples.

Figure 1:
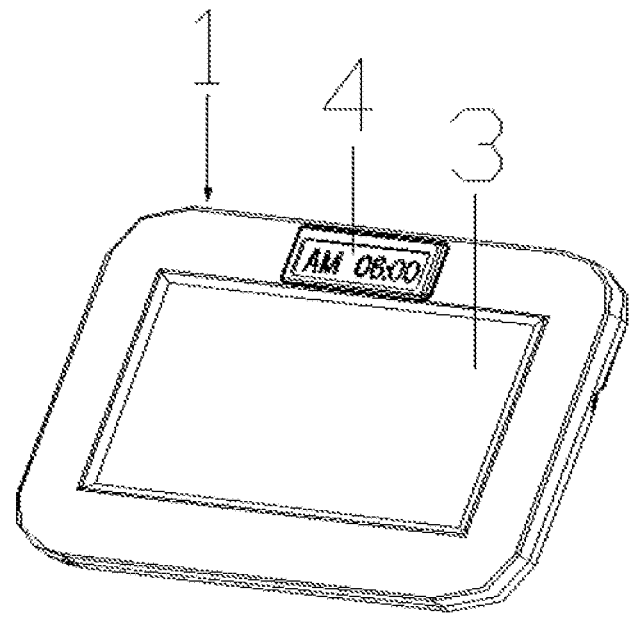
FIG. 1 an overall structural diagram of a fluorescent blackboard of the present disclosure.
Figure 2:
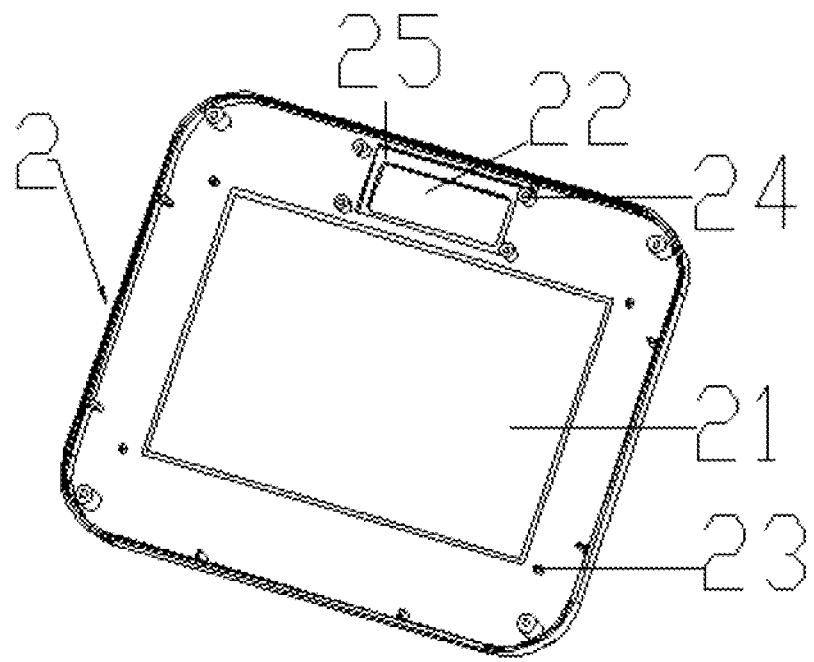
FIG. 2 is a structural diagram of a front housing of an example of the present disclosure.
Figure 3:
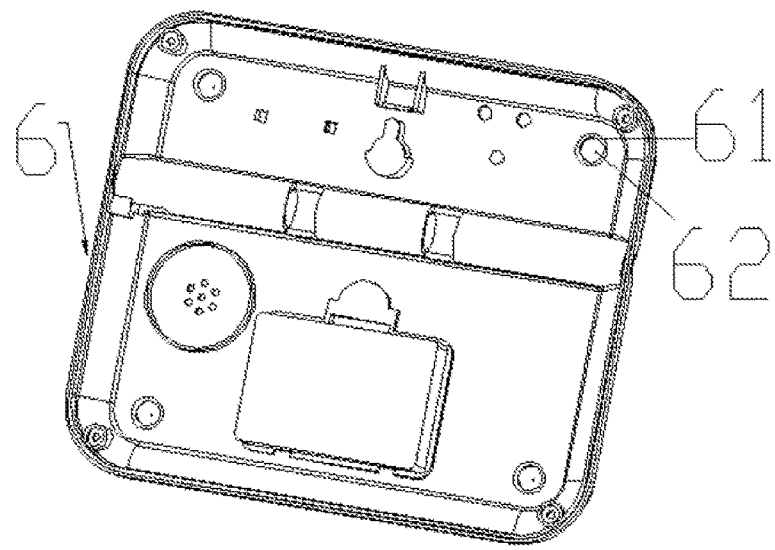
FIG. 3 is a structural diagram of a rear housing of the example of the present disclosure.
Figure 4:
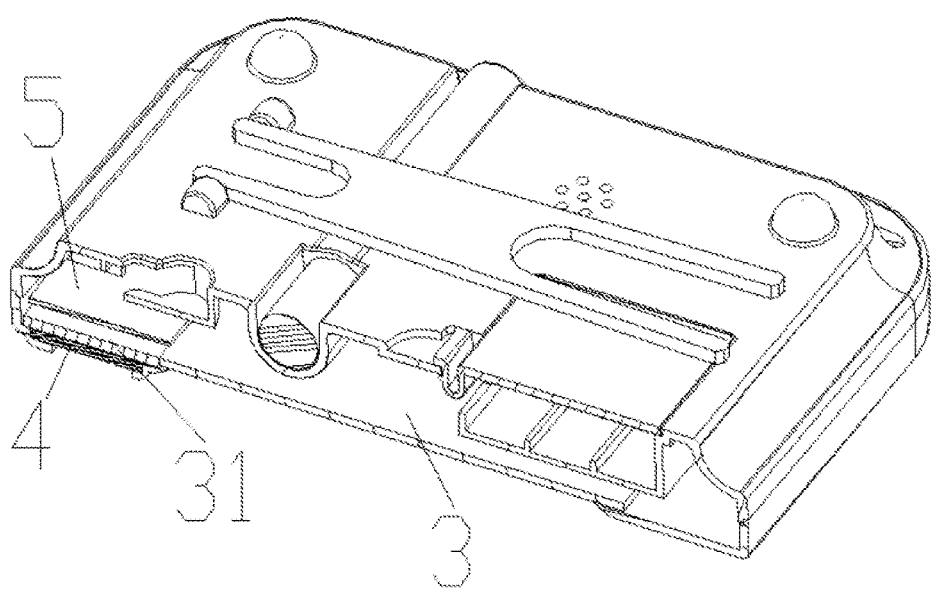
FIG. 4 is a cross-sectional schematic diagram of the example of the present disclosure.

A fluorescent blackboard 1 comprises a housing, a circuit board fixed on the housing by screws, a display screen fixed by the circuit board, and a panel attached and fixed on the housing by the adhesive tape. As shown in FIGS. 1 to 4, the fluorescence blackboard 1 is configured with a fixed device that limits and fixes the panel 3. The present disclosure uses that the fluorescent blackboard 1 configured with the fixed device that limits and fixes the panel 3, which makes the panel 3 be firmly limited and fixed on the housing, which avoids the panel from coining loose. When the panel 3 is squeezed, the fixed device can protect the panel 3, which avoids damage to the panel 3.

The housing of the fluorescent blackboard 1 of the present disclosure comprises a front housing 2 and a rear housing 6, where the front housing 2 and the rear housing 6 are fixed by screws. The panel 3, a display screen 4, and a circuit board 5 are arranged on the front housing 2. The fluorescent blackboard further comprises a battery for power and an alarm clock, where the alarm clock comprises the display screen 4 and a horn. The horn is attached on the rear housing 6, and the rear housing 6 is configured with a placing groove and a sounding hole used to emit sound. Therefore, a user can write on the fluorescent blackboard 1 what to do at a certain time, and set the time. The horn rings at the set time, which avoids the user from forgetting. It should be understood that the fluorescent blackboard is also used as the alarm clock.

In the example, the fixed device limits and fixes the panel 3, and the panel is attached on the fixed device by the adhesive tape.

In the example, the fixed device comprises a limiting column 23, a supporting column 61, and a supporting element, which makes the panel 3 be firmly fixed on the housing, which avoids the panel from coming lose. When the panel 3 is squeezed, the fixed device can protect the panel 3, which avoids the panel 3 from damaging, the present disclosure will further be described in detail as follow.

In the example, the housing is configured with a first through hole 21 for the panel 3, more specifically, the first through hole 21 is arranged on the front housing 2, which is convenient to use. The fixing device comprises a limiting column 23 arranged around the first through hole 21. The panel 3 is configured with a limiting hole that matches with the limiting column 23, and the panel 3 is placed on the first through hole 21. The limiting column 23 is inserted into the limiting hole of the panel 3, which limits the panel 3 and avoids the panel 3 from moving at left and right directions of the panel 3, further fixing the panel. More specifically, the limiting column 23 is cylindrical and the limiting hole is a circular hole, where a diameter of a cross-section of the limiting column 23 is less than a diameter of the limiting hole, which makes the limiting column 23 convenient to match with the limiting hole. A cross-section of the panel 3 is rectangular. The number of the limiting holes is four, and the four limiting holes are arranged on four corners of the panel 3, respectively. Correspondingly, the number of the limiting column 23 is also four, and the four limiting holes match with the four limiting columns, respectively, which makes the limiting column uniformly limit and fix the panel, further improving limiting and fixing effect.

In the example, the housing comprises the front housing 2 and the rear housing 6, the display screen 4 and the panel 3 are arranged on the front housing 2. The fixed device further comprises the supporting column 61 arranged on the rear housing 6. When the front housing 2 and the rear housing 6 are fixed, the supporting column closely matches with the panel 3, which makes the panel 3 firmly fix by the supporting column 61. When the panel 3 is squeezed, the supporting column 61 supports the panel 3 under the pressure, which avoids the adhesive tape from losing its stickiness. The number of the supporting columns 61 is four, and the four supporting columns 61 are arranged according to positions of the four limiting columns 23, respectively. The supporting column 61 is configured with a groove 62 placed by the limiting column 23. The limiting column 23 is cylindrical, and the groove corresponding is a circular groove. The supporting column 61 is cylindrical, and the limiting column 23 is placed in the groove 62 of the supporting column 61. Therefore, the front housing 2 and the rear housing 6 are fixed and limited each other, which avoids the panel 3 moving at left and right directions of the panel 3, further avoiding the supporting column 61 from damaging the panel 3. The limiting column 23 is arranged around the first through hole 21, and a contact portion of the supporting column 61 and the panel 3 is not a display portion of the panel 3. It should be understood that shape and the number of the supporting column 61 are different.

As the supporting column 61 only limits and fixes portion of the panel 3 that does not display, the display portion of the panel 3 is not protected and supported. In the example, the fixed device further comprises a supporting element fixed between the panel 3 and the rear housing 6 by the glue or double-sided adhesive tape. The supporting element is made of a flexible and elastic material The supporting elements are arranged at intervals. The supporting column 61 is arranged on an edge of the panel 3, which avoids damage to the panel when the panel 3 is squeezed or during installation of the panel. The supporting element is made of the flexible and elastic material, which avoids damage to the panel. The supporting element is corresponding compressed when the panel 3 is squeezed, and the supporting element restores an original state after the panel 3 is squeezed, which improves limiting effect and protection of the panel 3. The supporting element of the example is also cylindrical, and the number of the supporting element is three. The supporting elements are arranged at intervals on the display portion of the panel 3. It should be understood that shape and the number of the supporting element are different.

In the example, the panel 3 is configured with an end portion 31 placed between the display screen 4 and the circuit board 5, where the circuit board 5 is fixed to the housing by the screws, and the circuit board 5 is arranged on the display 4, which makes the display screen 4 fix. The end portions 31 of the panel 3 is arranged between the display screen 4 and the circuit board 5, which makes the circuit board 5 fix the circuit board 5 and the end portions 31, further fixing the panel 3. The housing is configured with a second through hole 22 for the display screen 4. More specifically, the second through hole 22 is arranged on the front housing 2, and is located in an upper position of the second through hole 22. An depression 25 is formed around outside direction of an edge of the second through hole 22, which limits and fixes the display screen. The display screen 4 is placing on the depression 25, and the end portions 31 is closely fixed to the display screen 4, which makes the display screen 4 match with the depression 25. A cross-section of the display screen 4 is rectangular, and correspondingly, the depression 25 is also rectangular, where an sidewall of the depression 25 is configured with two bumps having a gap in between. The display screen 4 is configured with a second bump corresponding to a position of the gap of the two bumps. The gap matches with the second bump, which limits the position of the display screen 4, further firmly fixing the display screen 4. And the end portions 31 is closely fixed to the display screen 4, the panel 3 does not need to be tilted when installed and can be installed flat, which is convenient to fix the panel to the housing.

In the example, the housing is configured with four screw hole columns 24 that matches with the circuit board 5, where two of the four screw hole columns 24 are arranged on two sides of the end portion 31, respectively, and two of the four screw hole columns 24 are arranged on an connection position of the end portion 31 and the panel 3. The panel 3 is configured with two column holes that matches with the screw hole column 24, which limits and fixes the panel 3. A rectangular space is formed among the screw hole columns 24, and the end portion 31 is rectangular. It should be understood that the end portions is larger, and two sides of a top part of the end portions are configured with two column holes that matches with the screw hole columns, which increases limiting area.

In the example, the end portion 31 is configured with a third through hole that evades the display screen 4 and the circuit board 5. The display screen 4 is connected with the circuit board 5, and the display screen 4 displays, which is convenient to make the display screen 4 match and connect with the circuit board 5. The third through hole is rectangular. It should be understood that move can replace the third through hole, namely, the top part of the end portion is configured with the groove, which is convenient to make the display screen 4 match and connect with the circuit board 5.

In the example, the fluorescent blackboard 1 further comprises a light-emitting diode (LED) lamp arranged on the circuit board 5. The number a the LED lamp is three. The LED lamps are arranged between the panel 3 and display screen 4. Three lamp holes are arranged on connection position of the panel 3 and the end portion 31, and the lamp holes is used to be placed by the LED lamps, therefore, LED lamps display between the panel 3 and the display screen 4.

In the example, the first through hole 21 is rectangular, and an edge of the first through-hole 21 is configured with a convex, a distance between an outer surface of the convex and an outer surface of the first through hole 21 gradually decreases, which firms certain gradient that matches with the panel, further improving aesthetics.

The present disclosure is described in detail in accordance with the above contents with the specific exemplary examples. However, this present disclosure is not limited to the specific examples. For the ordinary technical personnel of the technical field of the present disclosure, on the premise of keeping the conception of, the technical personnel can also make simple deductions or replacements, and all of which should be considered to belong to the protection scope of the present disclosure.

I claim:

1. A fluorescent blackboard, comprising:
a housing;
a circuit board fixed on the housing by screws;
a display screen fixed by the circuit board;
a panel attached and fixed on the housing by an adhesive tape; and
a fixed device that limits and fixes the panel; wherein the housing is configured with a first through hole for the panel; the fixing device comprising a limiting column arranged around the first through hole and the panel is configured with a limiting hole that matches with the limiting column;
wherein the fixed device comprises a supporting element fixed between the panel and a rear housing by attached or double-sided adhesive tape; the supporting element is made of a flexible and elastic material; the supporting elements are arranged at intervals.

2. The fluorescent blackboard of claim 1, wherein a cross-section of the panel is rectangular; a number of the limiting holes is four, and the four limiting holes are arranged on four corners of the panel, respectively.

3. The fluorescent blackboard of claim 1, wherein the panel is configured with an end portion placed between the display screen and the circuit board.

4. The fluorescent blackboard of claim 3, wherein the housing is configured with a second through hole for the display screen; an depression is formed around outside direction of an edge of the second through hole; the display screen is placing on the depression, and the end portions is closely fixed to the display screen.

5. The fluorescent blackboard of claim 4, wherein the end portion is configured with a third through hole or a groove that evades the display screen and the circuit board.

6. The fluorescent blackboard of claim 4, wherein the housing is configured with four screw hole columns that matches with the circuit board; two of the four screw hole columns are arranged on two sides of the end portions, respectively, and two of the four screw hole columns are arranged on an connection position of the end portion and the panel; the panel is configured with two column holes that matches with the screw hole column.

7. The fluorescent blackboard of claim 1, wherein the fixed device comprises a supporting column; the number of the supporting columns is four, and the four supporting columns are arranged according to positions of the four limiting columns, respectively; the supporting column is configured with a groove placed by the limiting column.

* * * * *